United States Patent [19]
Ertl et al.

[11] Patent Number: 5,542,188
[45] Date of Patent: Aug. 6, 1996

[54] MEASURING APPARATUS FOR CHECKING THE DIMENSIONS OF CYLINDRICAL WORKPIECES

[75] Inventors: Friedrich Ertl, Ettlingen; Hans-Ulrich Bertz, Kuppenheim, both of Germany

[73] Assignee: Zeiss Messgerätebau GmbH, Ettlingen, Germany

[21] Appl. No.: 479,761

[22] Filed: Jun. 7, 1995

[30] Foreign Application Priority Data

Jun. 9, 1994 [DE] Germany ............... 44 20 137.0

[51] Int. Cl.⁶ ............... G01B 7/12; G01B 7/28
[52] U.S. Cl. ............... 33/605; 33/655; 33/549
[58] Field of Search ............... 33/710, 711, 803, 33/517, 519, 603, 605, 600, 655, 549, 550, 551, 553, 554, 555, 555.1

[56] References Cited

U.S. PATENT DOCUMENTS

| | | | |
|---|---|---|---|
| 1,447,346 | 3/1923 | Gilman | 33/605 |
| 1,534,408 | 4/1925 | Parrott | 33/605 |
| 1,595,713 | 8/1926 | Dauerell | 33/605 |
| 1,938,216 | 12/1933 | Dauerell | 33/605 |
| 2,807,973 | 10/1957 | Meyer et al. | 33/517 |
| 3,846,916 | 11/1974 | Moriya et al. | 33/550 |
| 3,877,151 | 4/1975 | Roberts | 33/605 |
| 4,351,115 | 9/1982 | Possati . | |
| 4,651,438 | 3/1987 | Hutter et al. . | |
| 4,665,625 | 5/1987 | Ireland et al. | 33/549 |
| 5,086,569 | 2/1992 | Possati et al. | 33/549 |

FOREIGN PATENT DOCUMENTS

| | | | |
|---|---|---|---|
| 0428543 | 9/1992 | European Pat. Off. . | |
| 285201 | 11/1990 | Japan | 33/605 |
| WO87/07007 | 11/1987 | WIPO . | |
| WO93/10420 | 5/1993 | WIPO . | |

OTHER PUBLICATIONS

"Kurbelwellen–Messmaschinen fur 100%–Kontrolle von Grossserien" by Hommelwerke GmbH, Germany. No date.

*Primary Examiner*—Thomas B. Will
*Attorney, Agent, or Firm*—Walter Ottesen

[57] ABSTRACT

A measuring apparatus checks crankshafts 6 and has a rotatable workpiece holder (4, 5), a first group of bifurcated measuring devices (12a, 12b, 12c, 12d) for measuring the main bearings of the crankshaft and a second group of bifurcated measuring devices (19a, 19b) for measuring the connecting-rod bearings. Each bifurcated measuring device of the second group has several measuring sensors and its own drives for moving the bifurcated measuring device in the plane perpendicular to the axis of the crankshaft. When the crankshaft 6 is rotated, each bifurcated measuring device of the second group is either controlled on desired paths in accordance with the stroke of the connecting-rod bearing or is following up the movement of the connecting-rod bearing according to the signals of the measuring sensors.

16 Claims, 6 Drawing Sheets

MEASURING APPARATUS FOR CHECKING THE DIMENSIONS OF CYLINDRICAL WORKPIECES

BACKGROUND OF THE INVENTION

The known measuring apparatus for checking crankshafts as to location, position and form of the main and connecting-rod bearings can be classified into three categories as delineated below.

The first category consists of so-called multipoint measuring apparatus. In such an apparatus, a separate measuring device is provided for each bearing so that all bearings can be measured simultaneously when the crankshaft is rotated. Such apparatus are very complex and expensive due to the multitude of measuring devices. Also, these apparatus are not very flexible because the measuring devices must be adapted exactly to the geometry of the crankshaft to be checked. For these reasons, such apparatus are normally used only for the 100% inspection of large series. Multipoint measuring apparatus for crankshafts are described, for example, in the corporate publication of Hommelwerke GmbH of Schwenningen, Germany, entitled "Kurbelwellen-Meßmaschinen", print no. 8.89 Ko, and in U.S. Pat. No. 4,651,438. A multipoint measuring apparatus suitable for camshafts is described in the international patent publication WO 93/10420.

Coordinate measuring apparatus belong to the second category of measuring apparatus serving the above-mentioned purpose. These apparatus, developed for the measurement of very different workpieces, are quite flexible, but they require long measuring times because all positions must be measured sequentially with the one probe with which the apparatus is equipped.

The third category of measuring apparatus constitute so-called combination measuring apparatus. These are generally configured like a coordinate measuring apparatus having a cylinder coordinate design for rotationally symmetrical workpieces and are equipped with a measuring edge which is used to measure the different bearings sequentially. Here, the connecting-rod bearing slides along the measuring edge. A measuring apparatus having an optical measuring edge is described, for example, in the international patent publication WO 87/07007. Such apparatus are more flexible and less complex than multipoint measuring apparatus, but they do not achieve the short measuring times of multipoint measuring apparatus.

One common feature of the known crankshaft measuring apparatus of all three categories is the fact that the measuring means used to contact the connecting-rod bearings are practically always in direct mechanical contact with the connecting-rod bearings and are entrained by the crankshaft when the same is rotated. For this reason, a considerable measuring force is applied to the connecting-rod bearings to be measured by the measuring devices during the measuring process and this results in corresponding starting vibrations, wear and measuring uncertainties. In order to reduce the measuring forces, the measuring apparatus described in U.S. Pat. No. 4,351,115 and European Patent 0,428,543 employ counterweights to relieve the load on the tracking arm.

SUMMARY OF THE INVENTION

It is the object of the invention to provide a measuring apparatus for checking the dimensions of cylindrical workpieces, especially crankshafts, which largely avoids the above-mentioned disadvantages. In particular, the apparatus must be sufficiently flexible to be used without difficulty for small series, and must ensure relatively short measuring times while maintaining sufficiently high measuring accuracy.

This task is solved according to the invention by using a measuring apparatus which includes: a rotatable workpiece holder; a first group of measuring devices for measuring the centric sections of the workpiece; a second group of measuring devices for measuring the eccentric sections of the workpiece; each measuring device of the second group having several measuring sensors and its own drive for movement in the plane perpendicular to the longitudinal workpiece axis; and, when the workpiece is rotated, the measuring devices of the second group being controllable on desired paths corresponding to the eccentricity of the section to be measured, or the positions of the measuring devices being readjustable in accordance with the signals of the measuring sensors so as to follow the movements of the section to be measured.

The apparatus according to the invention affords several advantages. As a first advantage, the devices for measuring the connecting-rod bearing can be adapted to crankshafts having a changed stroke or having a changed location of the connecting-rod bearings in the direction of the longitudinal axis of the crankshaft without retrofitting the apparatus. Notwithstanding this increased flexibility over multipoint apparatus, the resulting measuring times are nonetheless relatively short because the second group of measuring devices simultaneously measures several connecting-rod bearings. As a second advantage, the apparatus offers the possibility to measure (without any additional complexity) not only the diameter and the concentricity of the connecting-rod bearing but also its stroke. Finally, as a third advantage, the measuring apparatus according to the invention supplies highly accurate measurement data because the measuring devices of the second group are not mechanically entrained but are guided in such a way during rotation of the crankshaft that the measurement is performed virtually force-free except for the slight mechanical contact between the tip of the measuring sensors and the surface to be measured, and furthermore, the measurement circle is closed via the short path directly above the bifurcated measuring devices and not through all axes of movement as is the case with typical multiaxis measuring apparatus.

The measuring devices of the first group are preferably bifurcated measuring devices which remain stationary on a workpiece during the measuring operation and are adapted to the location of the main bearings of the crankshaft, which, however, are adjustably mounted in the direction of the longitudinal axis of the workpiece axis so that they can also be adapted to crankshafts having a changed geometry of the main bearings. For this purpose, it can also be provided that a portion of the bifurcated measuring devices of the first group are adjustable perpendicularly to the longitudinal axis of the workpiece. These additional bifurcated measuring devices are only required if crankshafts with a higher number of main bearings must be measured.

An optimum compromise between equipment complexity, measuring time and flexibility is obtained if the number of measuring devices of the second group, that is, the number of bifurcated measuring devices, which are used to measure the connecting-rod bearings, is lower than the number of connecting-rod bearings of the workpiece itself. It is possible, for example, to detect the connecting-rod bearings of the crankshaft of a four-cylinder engine using two bifurcated measuring devices in two measuring runs, in between which the bifurcated measuring devices of the second group are only axially displaced automatically once.

In order to provide the highest flexibility, it is also of advantage if at least several of the measuring devices are bifurcated measuring devices which can measure bearings of varying effective diameters. For this purpose, the bifurcated measuring devices can be configured, for example, according to a digital caliper gauge or a stepped bifurcated measuring device. Another possibility is to make the measuring devices interchangeable, for example by applying magnetic voltage to a three-point bearing in a manner similar to the interchangeable probes of coordinate measuring apparatus.

In order to adapt to an automatic operation with workpieces being loaded by autohandling systems, it is advantageous when the axis of the workpiece holder is aligned horizontally and all bifurcated measuring devices are arranged on one side of the axis of the workpiece holder, either behind or in front thereof. The measuring apparatus can be then very easily integrated into existing automatic handling and loading systems in the production process.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
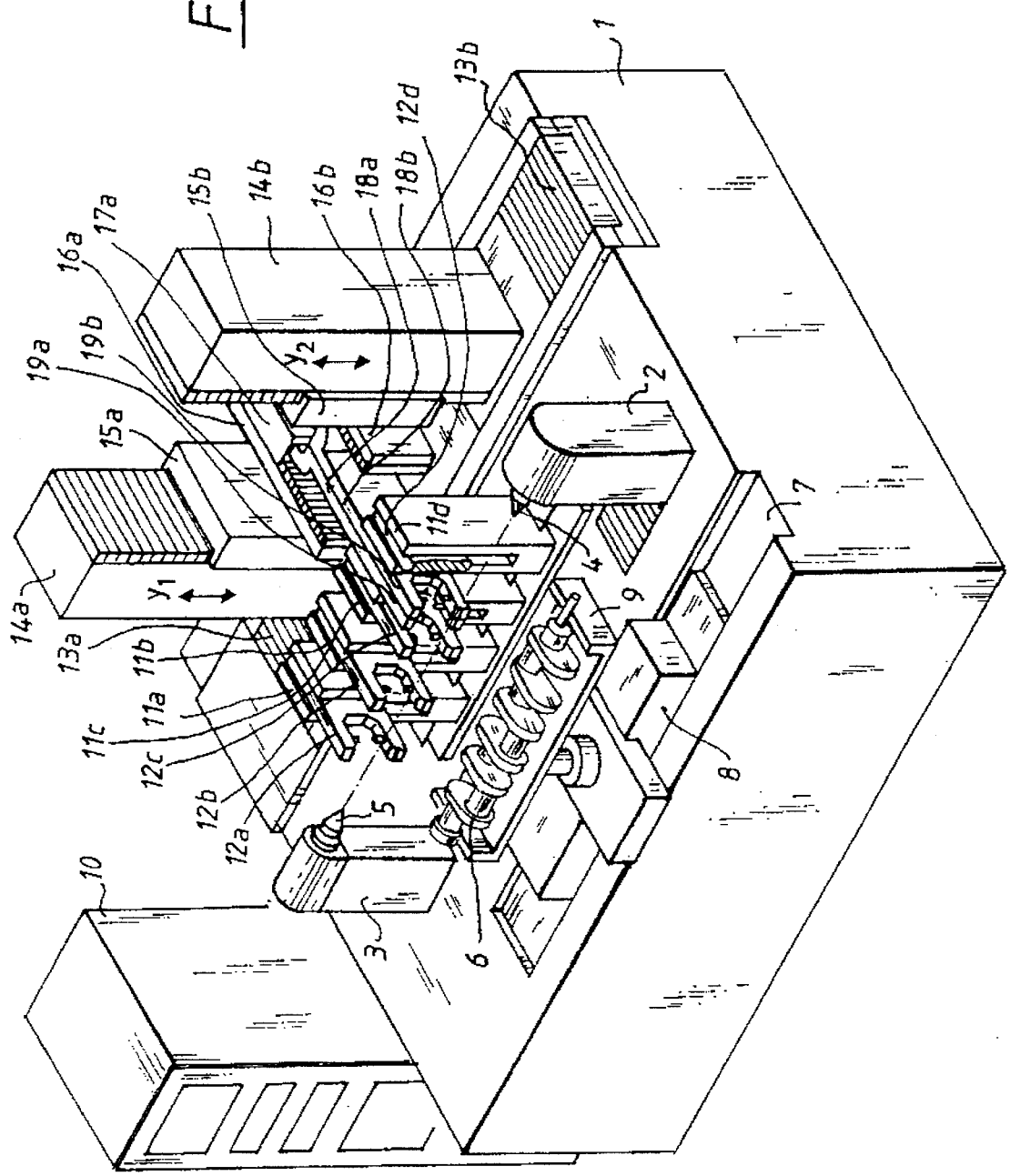
FIG. 1 is a perspective schematic diagram showing an overall view of a crankshaft measuring apparatus according to the invention.
Figure 2:
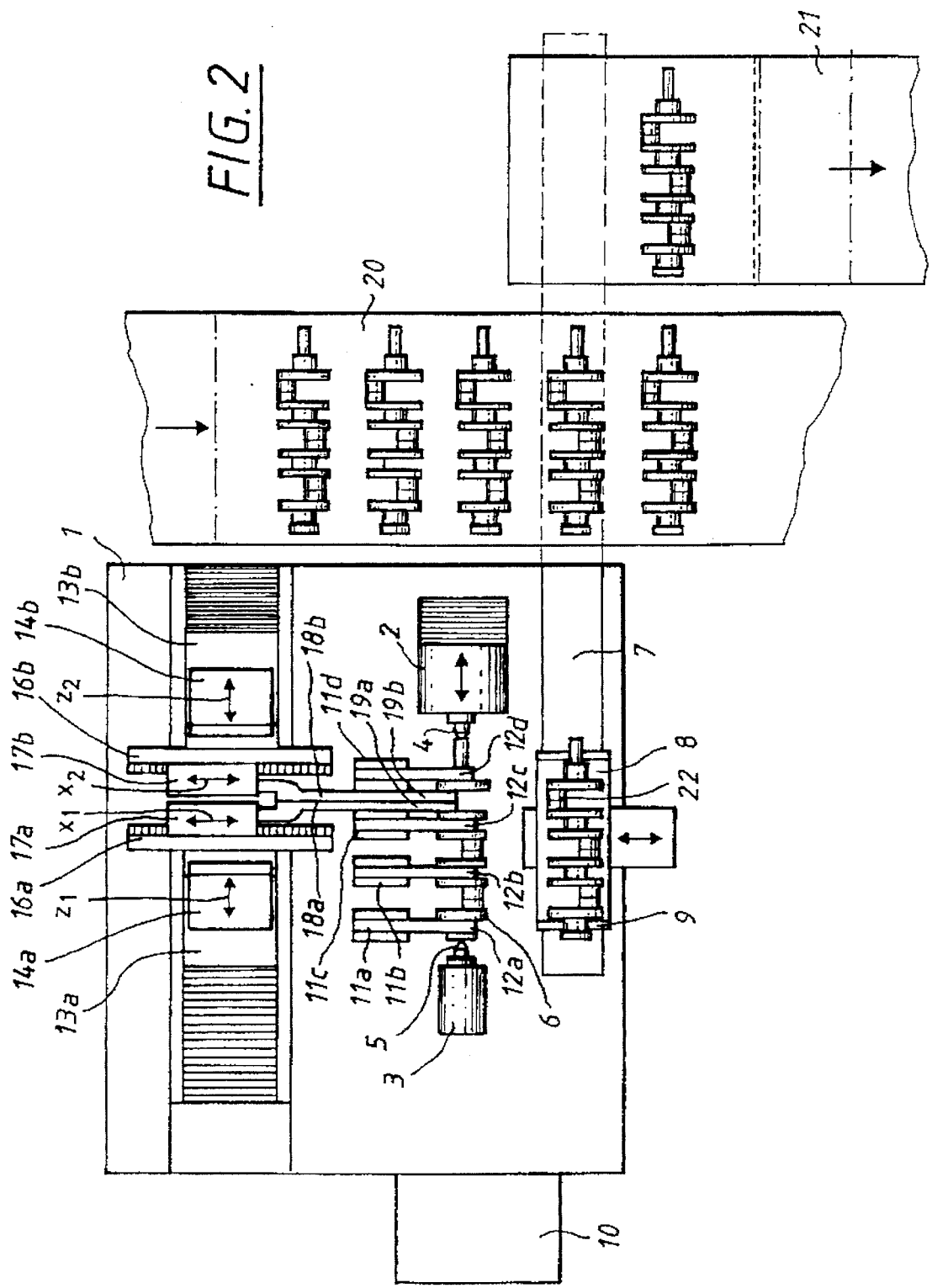
FIG. 2 shows a plan view of the apparatus of FIG. 1.

The crankshaft measuring apparatus shown in FIGS. 1 and 2 has an apparatus base 1 made, for example, of gray cast iron, on which two supports 2 and 3 are set up for the two spindle tips 4 and 5 between which the crankshaft 6 to be measured is clamped. The support 2 with tip 4 is displaceable in the direction of the longitudinal crankshaft axis in order to permit a crankshaft to be clamped and to be adaptable to crankshafts of different length. The support 2 also includes a drive (not shown) for rotating spindle tip 4 and an encoder (not shown) for measuring the rotational angular position. The entraining device which transmits the movement of spindle tip 4 to the crankshaft 6 is also not shown.

An automatic handling system 8 is slideably journalled in a slideway 7 and loads the crankshaft 6 on the apparatus after taking the crankshaft to be measured from a conveyor belt 20 located adjacent to the measuring apparatus. The handling system 8 places the crankshaft on a second conveyor belt 21 after the measuring operation.

On the side of apparatus base 1 facing away from the automatic handling system 8, four carriers (11a, 11b, 11c, 11d) are displaceably mounted on an inverted-vee slideway parallel to the connecting line of spindle tips 4 and 5. Each of these carriers holds a bifurcated measuring device (12a, 12b, 12c, 12d) with the opening thereof facing toward the front. The bifurcated measuring devices check the form and location of the four main bearings of the crankshaft 6 for deviations in the x-position and the form of the bearing faces. For this purpose, the fork of each bifurcated measuring device is equipped with two measuring sensors, for example, inductive probes, located opposite each other. The lightly resiliently-biased tips of the transducers are in contact with the bearing surface to be checked when the crankshaft is firmly held between spindle tips 4 and 5.

The tips of the spindles are configured as high-precision pivot bearings if the form is to be determined not only as a difference between the measured maximum and minimum diameters (ovality), but as a radius deviation from a quasi ideal axis.

To adapt to the location of the main bearings, the carriers (11a, 11b, 11c, 11d) with the bifurcated measuring devices (12a, 12b, 12c, 12d) can be adjusted in the direction of the longitudinal axis of the crankshaft 6. This adjustment only takes place when a batch of another type of crankshaft is to be measured. It is also possible to introduce additional bifurcated measuring devices into the inverted-vee slideaway, if crankshafts with a higher number of main bearings are to be measured.

The guideways for two further bifurcated measuring devices (19a, 19b) are arranged on the side of the measuring apparatus opposite the automatic handling system 8 and behind the bifurcated measuring devices (12a, 12b, 12c, 12d) for the main bearings. The bifurcated measuring devices (19a, 19b) can be used to measure the three pairs of mutually adjacent connecting-rod bearings of the crankshaft 6. For this purpose, the apparatus is equipped with two z-guideways (13a, 13b) in which two columns 14a and 14b are displaceably journalled. The two columns are displaceable by a motor horizontally and parallel to the connecting line between spindle tips 4 and 5. Each column has a motorized carriage 15a or 15b which is displaceable vertically in the direction of the arrows identified by $Y_1$ or $Y_2$, an additional guideway (16a, 16b) is built on and each of these carriages (15a, 15b) in which the two bifurcated measuring devices (19a, 19b) are displaceable by a motor in the direction of the arrows marked by $(x_1, x_2)$. For this purpose, the bifurcated measuring devices 19a and 19b are mounted on horizontal arms 18a and 18b, respectively, which are supported by carriages 17a and 17b, respectively. The carriages are displaceably journalled on guideways 16a and 16b. The drives of the three carriages or carriage pairs described above are driven by the control unit 10 of the measuring apparatus.

The two bifurcated measuring devices 19a and 19b provided for the measuring of the connecting-rod bearings are driven in the x/y plane perpendicular to the longitudinal axis of the crankshaft 6. For this reason, the measuring devices can follow the stroke of the connecting-rod bearings when crankshaft 6 is rotated. In this manner, the four main bearings and two connecting-rod bearings can be measured simultaneously in one revolution of crankshaft 6. The bifurcated measuring devices (19a, 19b) are then retracted in the direction of the arrows $x_1$ and $x_2$, repositioned in the z-direction and then used to measure the next pair of connecting-rod bearings. In this way, the six connecting-rod bearings of the crankshaft 6 of a 6-cylinder engine can be measured relatively quickly in only three revolutions of the crankshaft. If the spacings between the mutually adjacent connecting-rod bearings are constant, the two columns 14a and 14b can be mounted on a common z-axis.

Figure 3:
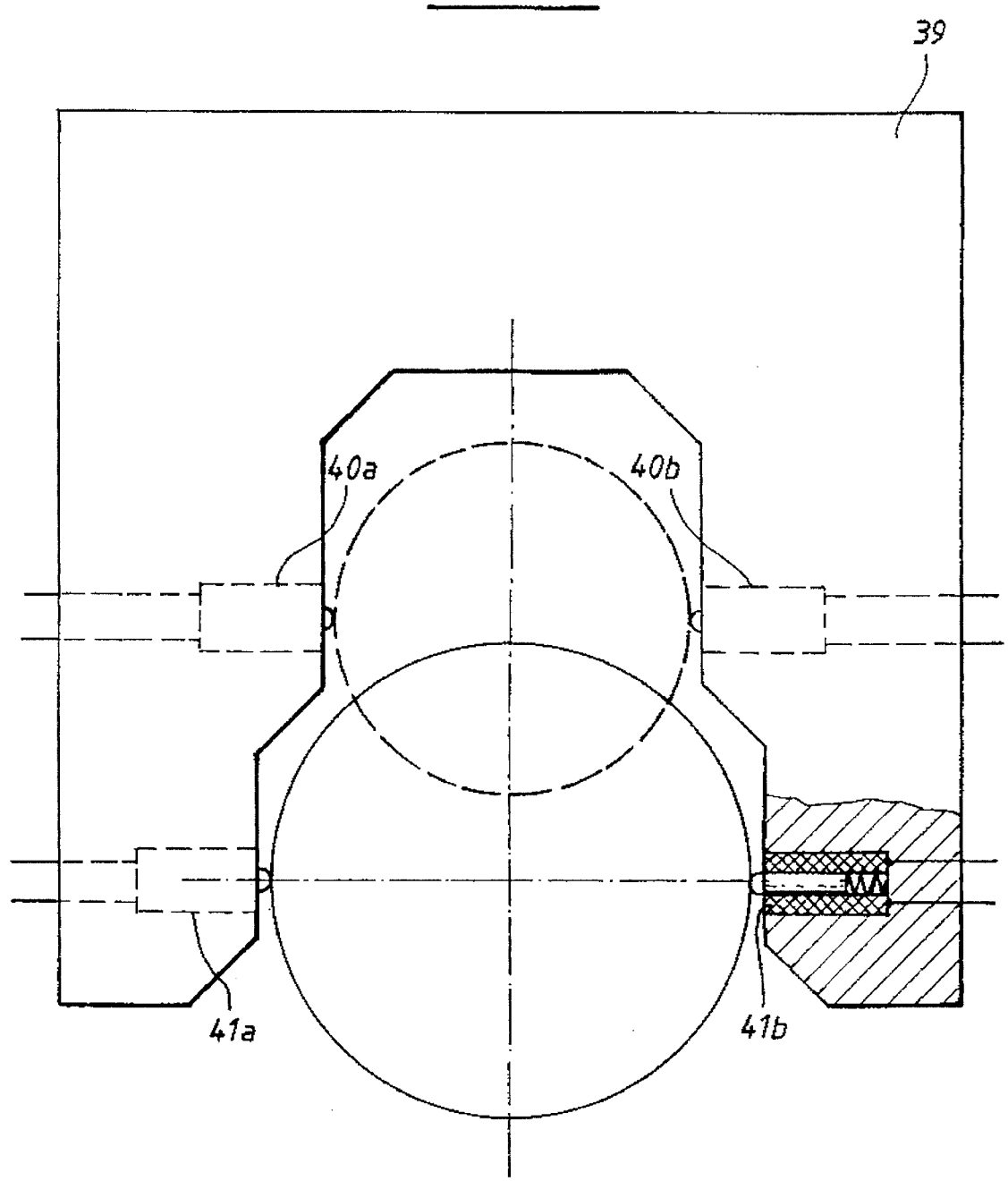
FIG. 3 is a simplified schematic of a stepped bifurcated measuring device.

In order to increase the flexibility of the apparatus, it can be advantageous to substitute stepped bifurcated measuring devices for the measuring devices 12 and 19. Such a stepped bifurcated measuring device 39 is shown in FIG. 3. The measuring device 39 has a stepped fork permitting bearings of different diameters to be encompassed. Both regions of the fork are equipped with a pair of opposite standing inductive probes (40a, 40b) and (41a, 41b). The signals of these probes are transmitted for data evaluation to the control unit 10. It is also possible to use other sensors in lieu of the inductive probes, for example capacitive, optical or pneumatic distance sensors.

Figure 4:
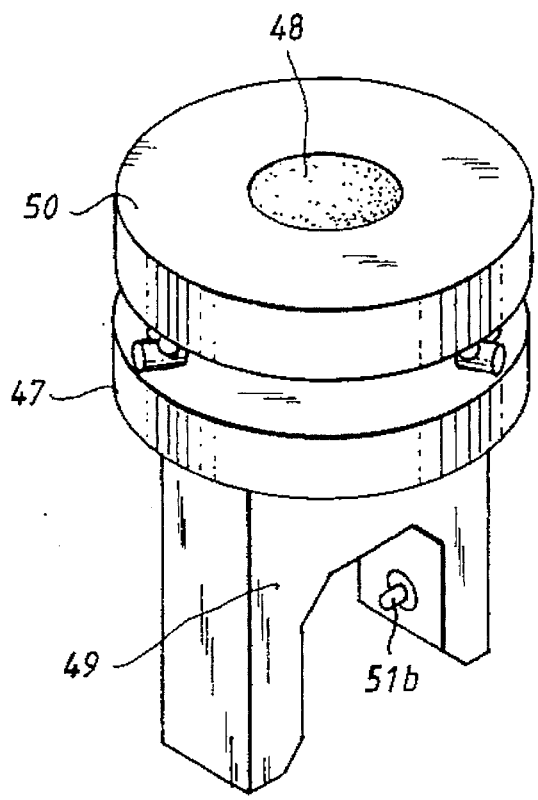
FIG. 4 is a perspective view of a bifurcated measuring device on an exchange holder.

FIG. 4 shows another possibility for adapting the bifurcated measuring devices to the diameters of the crankshaft bearings. The bifurcated measuring device 49 shown in FIG. 4 is mounted on an exchange plate 47 which, in turn, is tightly held against a three-point bearing by a magnet 48 in counterplate 50 on a stationary part of the measuring apparatus. There, it can be exchanged manually or automatically for bifurcated measuring devices having different fork widths.

Figure 5:
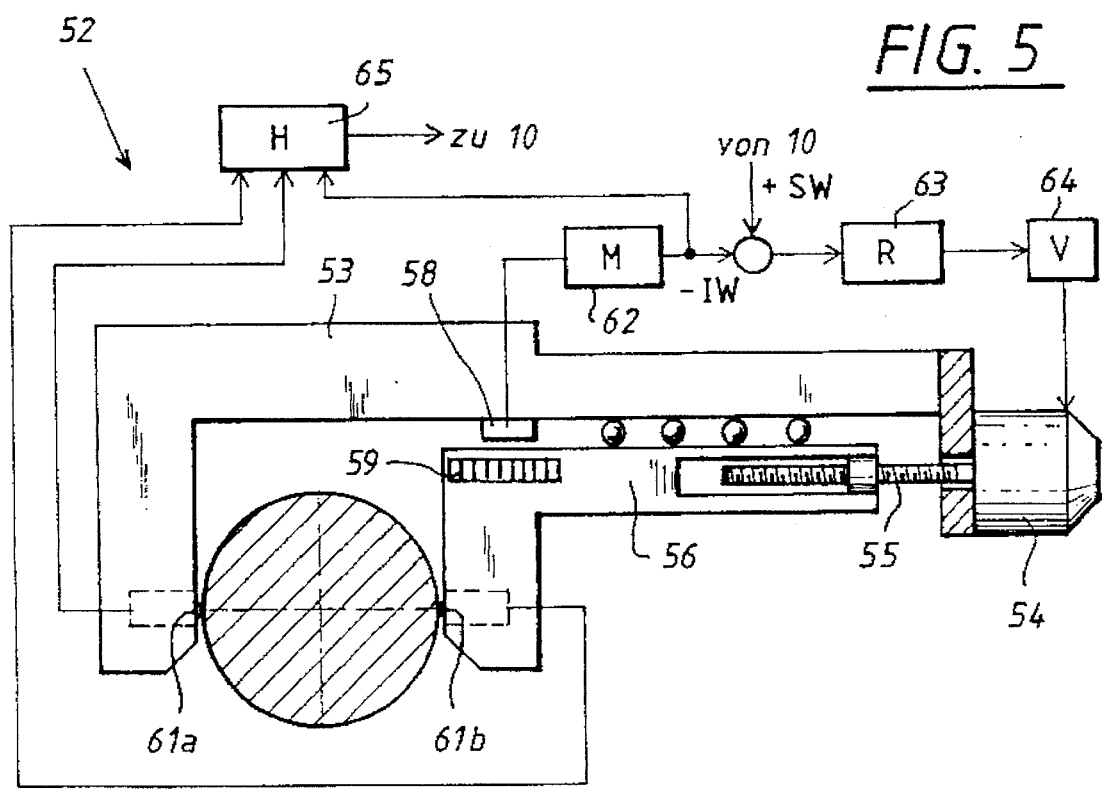
FIG. 5 is a simplified drawing of a bifurcated measuring device having an adjustable diameter.

Finally, it is possible to use bifurcated measuring devices having adjustable diameters and such a bifurcated measuring device 52 is shown in FIG. 5. A motor 54 is fixedly attached to base leg 53. This motor 54 acts via a spindle drive 55 on counterleg 56 which is supported by a ball-bearing guide on the base leg 53. The counterleg 56 carries a scale grating 59 which is scanned by a transducer 58. The value determined in this way in the evaluation circuit 62 for the measured value M (that is, the distance between legs 53 and 56) is transmitted to a circuit 65 as are the measured values of inductive probes 61a and 61b. From these signals, the circuit 65 then determines the diameter of the spindle, cam or bearing and transmits it to the control unit 10 of the measuring apparatus.

At the same time, the control unit 10 supplies the desired value for setting the diameter of the bifurcated measuring device and the desired value is compared to the actual value supplied by evaluation circuit 62. The difference signal is supplied to a controller 63 which drives output stage 64 which, in turn, drives motor 54.

Since the bifurcated measuring devices for determining the diameter and/or the form of the connecting-rod bearings are moved by numerical control, the surface of the bearing to be checked is probed force-free and virtually free of wear. This is explained in the following with respect to FIG. 6 where the major components of the motion control for the bifurcated measuring devices are shown as they can be implemented, for example, in control unit 10 of the apparatus of FIGS. 1 and 2.

Figure 6:
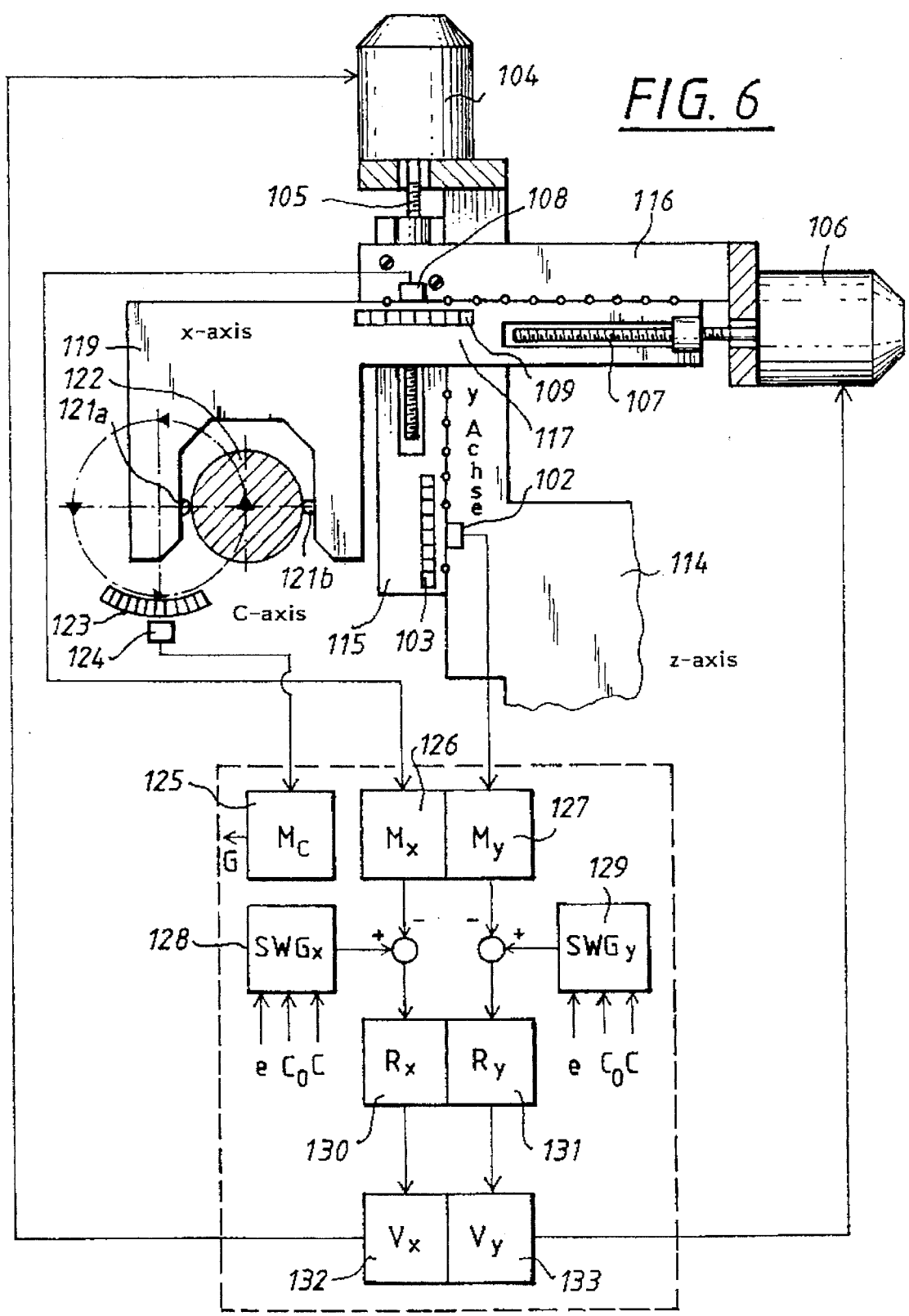
FIG. 6 is a block circuit diagram showing the important components for the movement control of bifurcated measuring devices, which are used to measure the connecting-rod bearings; and, FIG. 7 is a block circuit diagram showing the important components for readjusting the movement of the bifurcated measuring devices for the connecting-rod bearings according to an alternate embodiment.

In FIG. 6, the bifurcated measuring device 119 for the connecting-rod bearing is, as indicated by the ball bearings, supported so as to be movable in the plane perpendicular to the longitudinal axis of crankshaft 122. For this purpose, carriage 115, which is displaceable along guideway 114, is moved vertically by means of a motor 104 and a spindle drive 105. Correspondingly, the carrier 117 for the bifurcated measuring device 119 is moved along the horizontal guideway 116, which is fixedly mounted on carriage 115, by means of a motor 106 and a spindle drive 107. Photoelectric encoders 102 and 108 are assigned to respective ones of the guideways and scan grating scales 103 and 109 on the respective measuring carriages. Another encoder, identified by reference numeral 124, scans part circle 123 with which the angular position of crankshaft 122 is to measured.

The control unit shown operates in such a manner that, with a rotation of the crankshaft and thus with an eccentric movement of connecting-rod bearing 122, the bifurcated measuring device 119 is guided along the path corresponding to the stroke of the connecting-rod bearing 122 so that the connecting-rod bearing 122 always remains within the permissible measuring range of the two inductive probes 121a and 121b. For this purpose, the signals of the encoders 102 and 108 are fed to two circuits 126 and 127, which determine the position values in the direction of the x and y guideways, respectively. These actual position values are compared to the signals of two desired-value transmitters 128 and 129.

The desired-value transmitters 128 and 129 receive from the apparatus control unit 10 of the measuring apparatus the rotational angle data C (derived from the actual value signals indicating the angular position of the crankshaft) and the workpiece data $C_o$ and e, which define the start angle and the stroke of connecting-rod bearing 122. From rotational angle data C and the workpiece data ($C_o$ and e), the desired-value transmitters 128 and 129 form the desired values for the position of bifurcated measuring device 119 in the x and y axes by means of a sine/cosine analysis. By comparison of the desired values with the actual values, difference signals are obtained which are fed to the control components 130 and 131 for the x and y axes. These control components (130, 131), in turn, drive the output stages 132 and 133 for the two drive motors 104 and 106, respectively. The bifurcated measuring device 119 thus moves synchronously with connecting-rod bearing 122 on a desired circular path and the inductive probes 121a and 121b measure simultaneously the form deviation of the bearing surface and the deviations of the connecting-rod bearing stroke from the desired value.

Figure 7:
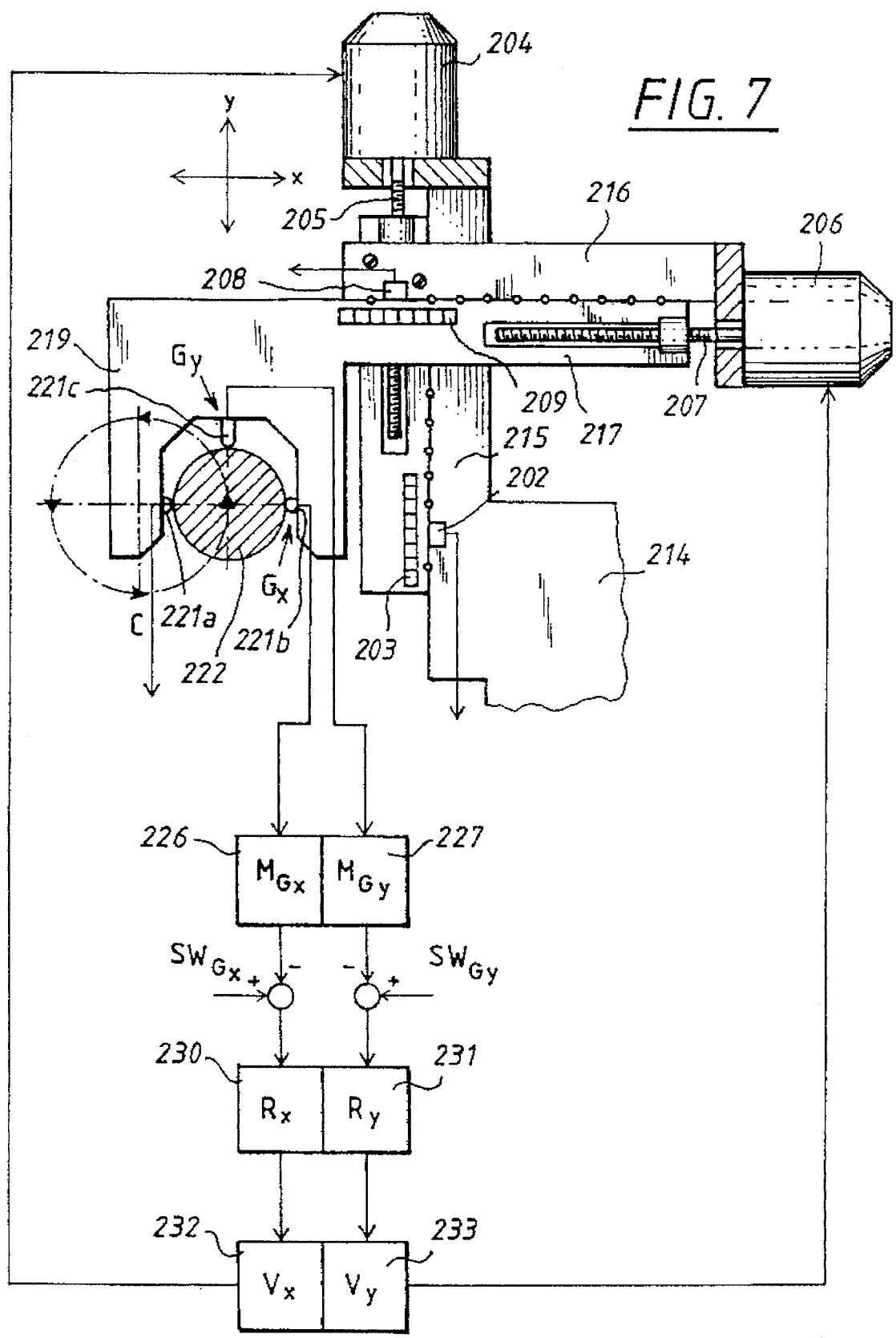

In the embodiment of FIG. 7, a somewhat different variation of the control of movement for the bifurcated measuring device 219 is shown. This embodiment operates like a servo control and uses the signals of the two inductive probes 221b and 221c, located within the bifurcated measuring device 219 to cause device 219 to track the movements of connecting-rod bearing 222. The inductive probes (221b, 221c) are aligned parallel to the x and y movement axes. The reference numbers of the components in FIG. 7 have been increased by 100 over the corresponding numerals in FIG. 6 so that a description of these components is not needed here.

Here, the follow-up of the position occurs in such a manner that the signals of the inductive probe 221b for the x-direction and of the inductive probe 221c for the y-direction are converted into actual probe values by the appropriate circuits 226 and 227, respectively. These actual probe values are compared to desired values which correspond to the center of the measuring range of the inductive probes. The difference signals define a departure of connecting-rod bearing 222 from the center of bifurcated measuring device 219. The difference signals are transmitted via respective controllers 230 and 231 to the respective motor output stages 232 and 233 for corresponding drive motors 204 and 206. These drive motors readjust the bifurcated measuring device 219.

Both control variations shown in FIGS. 6 and 7 are suitable for use in the crankshaft measuring apparatus shown in FIGS. 1 and 2.

In the foregoing, the invention is described in the context of crankshaft measuring apparatus. However, it is also possible to construct a measuring apparatus according to the invention for checking camshafts or other parts.

It is understood that the foregoing description is that of the preferred embodiments of the invention and that various changes and modifications may be made thereto without departing from the spirit and scope of the invention as defined in the appended claims.

What is claimed is:

1. A measuring apparatus for checking dimensions of a cylindrical workpiece defining a longitudinal axis and having centric and eccentric sections such as a crankshaft or a camshaft, the measuring apparatus comprising:

a workpiece holder for holding and rotating the workpiece thereby causing each of said eccentric sections to execute an eccentric movement;

first measuring devices for measuring the centric sections of said workpiece;

second measuring devices for measuring the eccentric sections of said workpiece;

each of said second measuring devices including a set of measuring sensors for measuring a corresponding one of said eccentric sections and for emitting signals indicative of the measurements;

a plurality of drive means for driving corresponding ones of said second measuring devices perpendicularly to said longitudinal axis; and, control means adapted to control each one of said second measuring devices on a desired path in correspondence to the eccentricity of the particular eccentric section to be measured when said workpiece is rotated thereby permitting the set of sensors of said one measuring device to measure the eccentric section or to control each one of said second measuring devices to track the eccentric movement of a corresponding one of said eccentric sections in correspondence to said signals when said workpiece is rotated.

2. The measuring apparatus of claim 1, further comprising a base; and, said first measuring devices being bifurcated measuring devices mounted on said base so as to be stationary during the measuring operation.

3. The measuring apparatus of claim 2, said first measuring devices being mounted on said base so as to be adjustable in a direction toward said longitudinal axis.

4. The measuring apparatus of claim 2, said first measuring devices being mounted on said base so as to be adjustable in a direction perpendicular to to said longitudinal axis.

5. The measuring apparatus of claim 1, wherein the number of said second measuring devices is equal to or less than the number of said eccentric sections; and, the apparatus further comprising means for adjusting said second measuring devices parallel to the longitudinal axis.

6. The measuring apparatus of claim 1, wherein said workpiece is a crankshaft and said measuring apparatus simultaneously measures the form of the main bearing and the stroke of the connecting-rod bearing.

7. The measuring apparatus of claim 1, wherein said workpiece is a camshaft and said measuring apparatus simultaneously measures the form of the bearing and the stroke of the cam.

8. The measuring apparatus of claim 1, wherein said first and second measuring devices are each bifurcated to have a fork-like configuration; each of said measuring devices having at least two of said sensors; and, each of said sensors being an inductive probe.

9. The measuring apparatus of claim 1, wherein each of said first and second measuring devices includes said sensors and said sensors being selected from the group consisting of optical sensors, capacitive sensors and pneumatic measuring nozzles.

10. The measuring apparatus of claim 1, wherein several of said measuring devices are bifurcated to define a fork-like configuration adapted to measure bearings of different diameters.

11. The measuring apparatus of claim 10, wherein the bifurcated measuring devices each have first and second legs and means for continuously adjusting the spacing between said legs.

12. The measuring apparatus of claim 10, wherein the bifurcated measuring devices each have first and second shoulders conjointly defining a stepped opening.

13. The measuring apparatus of claim 1, wherein said measuring devices are individual bifurcated measuring devices and said measuring apparatus further comprising exchange means for exchangeably holding said measuring devices.

14. The measuring apparatus of claim 1, said workpiece having first and second holding devices for holding the workpiece; and, said holding devices defining a horizontal axis.

15. The measuring apparatus of claim 14, wherein said first and second measuring devices are mounted to one side of said longitudinal axis.

16. The measuring apparatus of claim 15, further comprising an automatic handling and loading system mounted on the side of said horizontal axis opposite to said one side.

* * * * *